United States Patent [19]
Kirkendoll

[11] Patent Number: 5,875,094
[45] Date of Patent: *Feb. 23, 1999

[54] PORTABLE COMPUTER DOCKING STATION WITH ADJUSTABLE INSERTION ANGLE

[75] Inventor: Michael Kirkendoll, Houston, Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 691,336

[22] Filed: Aug. 2, 1996

[51] Int. Cl.⁶ .................................. G06F 1/16; H05K 7/10
[52] U.S. Cl. ............................................................ 361/686
[58] Field of Search ..................... 361/683–686; 364/708.1; G06F 1/16

[56] References Cited

U.S. PATENT DOCUMENTS

| | | |
|---|---|---|
| 5,030,128 | 7/1991 | Herron et al. . |
| 5,052,943 | 10/1991 | Davis . |
| 5,264,992 | 11/1993 | Hogdahl et al. ........................ 361/686 |
| 5,265,238 | 11/1993 | Canova, Jr. et al. . |
| 5,283,714 | 2/1994 | Tsai et al. . |
| 5,290,178 | 3/1994 | Ma . |
| 5,313,596 | 5/1994 | Swindler et al. . |
| 5,323,291 | 6/1994 | Boyle et al. . |
| 5,347,425 | 9/1994 | Herron et al. . |
| 5,377,357 | 12/1994 | Nishigaki et al. . |
| 5,396,400 | 3/1995 | Register et al. . |
| 5,410,447 | 4/1995 | Miyagawa et al. ..................... 361/681 |
| 5,411,416 | 5/1995 | Balon et al. . |
| 5,436,792 | 7/1995 | Leman et al. ........................... 361/686 |
| 5,450,271 | 9/1995 | Fukushima et al. . |
| 5,452,180 | 9/1995 | Register et al. ........................ 361/686 |
| 5,457,785 | 10/1995 | Kikinis et al . |
| 5,463,742 | 10/1995 | Kobayshi . |
| 5,477,415 | 12/1995 | Mitcham et al. . |
| 5,488,572 | 1/1996 | Belmont . |
| 5,493,542 | 2/1996 | Odelid . |
| 5,497,490 | 3/1996 | Harada et al. . |
| 5,526,493 | 6/1996 | Shu . |
| 5,535,093 | 7/1996 | Noguchi et al. . |
| 5,552,959 | 9/1996 | Penniman et al. . |
| 5,579,528 | 11/1996 | Register . |
| 5,619,397 | 4/1997 | Honda et al. ........................... 361/686 |
| 5,687,060 | 11/1997 | Ruch et al. ............................. 361/686 |

*Primary Examiner*—Lynn D. Feild
*Attorney, Agent, or Firm*—Robert Groover; Matthew S. Anderson

[57] ABSTRACT

A portable computer docking system wherein the angle of the slot which receives the portable computer can be adjusted for ergonomic optimization, while keeping the docking unit as a whole stationary in its mounted location.

45 Claims, 4 Drawing Sheets

PORTABLE COMPUTER DOCKING STATION WITH ADJUSTABLE INSERTION ANGLE

BACKGROUND AND SUMMARY OF THE INVENTION

The present invention relates to docking stations into which a small portable computer, such as a "notebook" computer, can be inserted.

Background: Physical Size of Portable Computers

Portable notebooks are driven by a desire to reduce size and weight. However there are certain minimums on the size and weight of a full-function portable computer, due to the necessary size of the keyboard and display. Similarly, there is a lower limit on weight due to the requirement for battery operation. While battery technology continues to advance, it is a much older technology, and a much more mature technology, than most areas of electronic technology. The advances which are achieved are therefore incremental, and no drastic shifts in energy content per unit weight appear likely. Typical weights for a complete useable travelling notebook computer run from around seven pounds down to less than four pounds. The dominating factor is battery size. Since battery energy densities are advancing relatively slowly, it is very difficult to reduce weight further for a given minimum operating time. A full-function operating time of at least an hour and a half is absolutely necessary, and an operating time of two or three hours or more is highly desirable. While advances in energy efficiency of the basic components continue to occur, such advances too are incremental (although continuous) rather than revolutionary. Thus, the marketplace will tend to drive a tradeoff between acceptable total weight and required minimum lifetime.

Thus the weight of a small portable computer is not insignificant, and will probably continue to be in the range of at least several pounds. In manipulating an object of this size, ergonomics is a consideration. The present invention provides an advance in ergonomics with small portable computers, which can be used to improve user comfort and/or convenience, and/or to provide better ergonomic matching to the articulation of the human wrist, elbow, and shoulder joint.

Background: Docking Stations

Docking stations are now often used to permit a portable computer to be easily connected to the better-quality display and input devices of a desktop work station. Thus a computer user can simply insert his portable computer into the docking station when he returns to his desk, and will thus be able to use the same hardware and software configuration at his workstation and on the road. Such docking stations will commonly include interfaces to power supply, CRT display, external keyboard and pointing device, and may also include interfaces to a network and to a CD ROM, audio amplifier, or other bulky accessories. The accessories used on the desktop, of course, are not constrained by the space, weight, and ruggedness requirements of portable use, and thus can be optimized to provide superior ergonomics.

Terminology: in the present application the term "docking station" will be used to refer to a station which permits insertion of a small portable computer in its closed position, and allows use of a desktop-quality user interface hardware (display, keyboard, pointing devices) with the microprocessor(s) and other central components of the portable computer. The term "port replicator" will be used to refer to simpler devices (like that sold for use with the Compaq LTE5000), which still require the user to use the portable computer's built-in interface hardware. (For example, with the Compaq LTE5000 the notebook computer is opened up to use its display and keyboard.)

Convenience of docking and undocking is a key objective in docking stations, and therefore the electrical connections in the docking station are often designed to provide a very quick connection to the portable computer. Typically the portable computer does not have to be opened up or run through its startup procedure, but is simply inserted into its docking bay.

The docking station can be thought of as a quick-connect socket for accessing the data, programs and environment configuration in a portable computer, from the I/O devices of an ergonomically optimized stationary computer.

A substantial body of literature exists regarding docking stations and their use. See, for example, the following patents, all of which are hereby incorporated by reference: U.S. Pat. Nos. 5,535,093; 5,526,493; 5,497,490; 5,493,542; 5,488,572; 5,477,415; 5,463,742; 5,457,785; 5,450,271; 5,411,416; 5,396,400; 5,377,357; 5,347,425; 5,323,291; 5,313,596; 5,290,178; 5,313,596; 5,290,178; 5,283,714; 5,265,238; 5,052,943; and 5,030,128.

Background: Modular Construction of Portable Computers

Due to the extreme constraints on size and power consumption in portable computers, an increasingly popular option has turned out to be the use of portable computers which have multiple modules. In such implementations, detachable modules will be used for functions, such as floppy disk drive, CDROM, additional battery module, or even hard disk drive, which are not necessarily used all the time. By making these modules interchangeable, the minimum volume of the functional machine is reduced, without totally precluding the use of those functions which may be desired for occasional use.

Background: Computer Ergonomics

Intensive computer usage requires a large amount of continuing activity from the small muscles and tendons of the wrist, hand, and fingers. It has been suggested that carpal tunnel syndrome or other repetitive motion disorders may be caused or exacerbated by intensive computer use. Therefore, it is highly desirable to design computers so as to avoid unnecessary stress on wrist, hand, and fingers. The present application discloses inventions which reduce such stress.

Innovative Docking Station

According to the innovative systems disclosed herein, an innovative docking station has a pocket into which a notebook computer can be inserted in a generally vertical or near-vertical direction. Preferably the docking station can be adjusted, without tools, to optimize the angle of insertion of the notebook computer. Preferably this is not a free movement, but a locking movement, so that the user can adjust this angle to meet his preference, and leave it set at the optimal angle.

Optionally, the docking station includes windows in its exterior for wireless data interface.

Optionally, an additional bay can also be included, as described in U.S. application Ser. No. 08/692838, which is commonly owned with and has an effective filing date simultaneous with that of the present application, and which is hereby incorporated by reference.

The electrical connection to the notebook computer is on the moveable part of the docking station. The moveable part is itself preferably rigid, together with the guides which guide the portable computer into the docking location. The electrical connection from the moveable part to the port connectors on the fixed part is preferably done merely by flexible jumper wires.

In the design of this unit, it should be noted that swiveling motions are expected to be fairly infrequent; provision is made rather for an adjustment than for dynamic or frequent changes. Thus the mechanism can be simple and inexpensive.

An advantage to the present invention is that this is an extremely simple unit which does not require any sophisticated electronics. (Other electronic functions can be added if desired, but they are not necessary for the various basic embodiments shown.)

Vertical-Insertion Dock Mountable to Vertical Surface

Another of the disclosed innovations is a docking station which mounts to a vertical surface, and into which the portable computer is inserted at an angle which is nearly, but not quite vertical (e.g. 70° to 85° from horizontal). This not only provides the advantages of quick and easy insertion, but also optimizes the use of available space.

One particularly convenient implementation of this docking station is as a device which is mounted vertically on the side of a desk. Alternative implementations include a wall-mounted design.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1A:
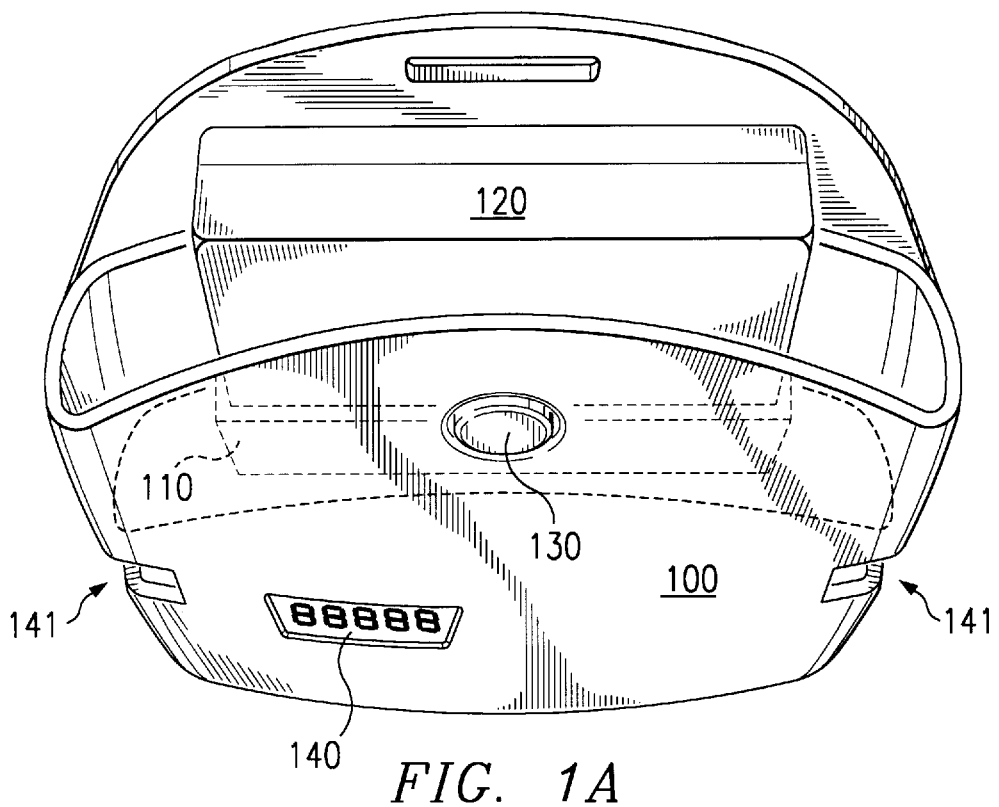
FIG. 1A is a front view of a sample docking station and portable computer according to the present invention, with axial adjustment for ergonomic optimization.

The numerous innovative teachings of the present application will be described with particular reference to the presently preferred embodiment (by way of example, and not of limitation), in which:

FIG. 1A is a front view of a sample docking station and portable computer according to the present invention, with axial adjustment for ergonomic optimization.

In FIG. 1A, note that the pocket is wider than necessary to receive the computer. This allows room for the axial adjustment.

Note that body 100 can be mounted to a desk side (or to a wall), but the receiver portion 110 (which includes the electrical connections for the portable computer) can be manually swivelled, when release button 130 is pressed, for adjustment to the ergonomically optimal position for a specific user. Both are preferably molded from a strong polymer. The receiver portion can be swiveled to provide a direction of insertion which is angled from one end of the long axis of the pocket toward the other end.

Note that this embodiment preferably also includes a small LCD or LED display 140 on the exterior of the body 100. This display 140 can be used to indicate status messages.

Also present on the exterior of the body 100, in the presently preferred embodiment, are IR interface ports 141. These permit wireless communication with nearby computers or smart peripherals.

Preferably rotation of the receiver 110 is enabled only when button 130 is pressed. Preferably the axis of rotation is normal to the direction of insertion of the computer, and normal to the largest flat exterior surface of the closed computer.

Figure 1B:
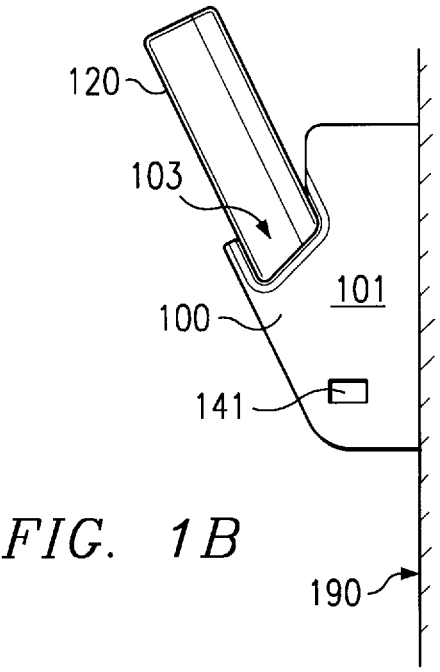
FIG. 1B shows an alternative embodiment, wherein a modified docking station is mounted to a wall.

FIG. 1B shows an alternative embodiment, wherein a modified docking station 101 is mounted to a wall 190 (or other vertical surface). In this case the primary aperture 103 is preferably angled out slightly (about 20° from vertical in this example), so that insertion and removal of the computer 120 is ergonomically optimal. Note, however, that this embodiment does not necessarily include the angular adjustment (between body and receiver) which is used in the embodiment of FIG. 1A. (Such angular adjustment can however be used with the embodiment of FIG. 1B if desired.)

Figure 2:
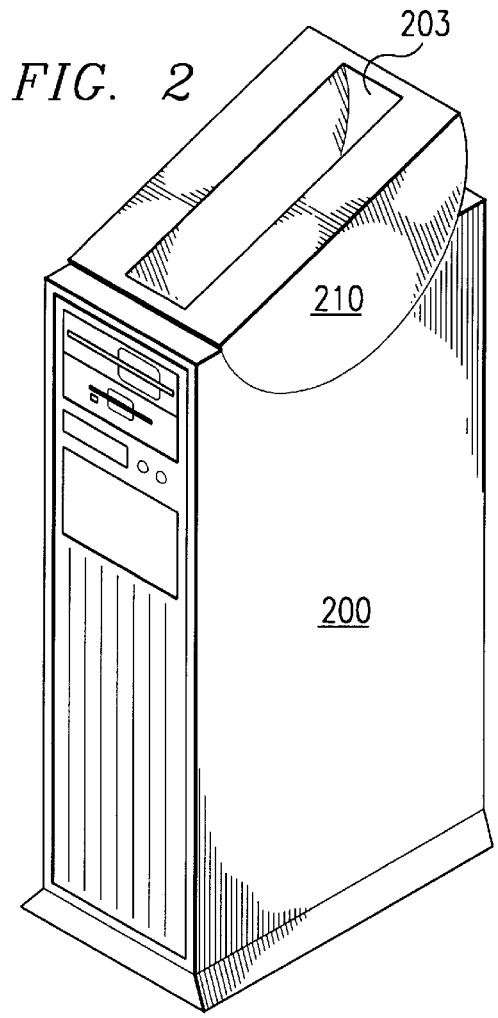
FIG. 2 shows a stand-mounted alternative embodiment. Note that the swiveling is particularly simple in this case. In this case the floor mount can optionally be combined with a chassis which also contains disk drives and power supply and other such components.

FIG. 2 shows a stand-mounted alternative embodiment. Note that the swiveling is particularly simple in this case. In this case the floor mount can optionally be combined with a chassis 200 which also contains disk drives, power supply, a printer, and/or other such components. The upper part 210 of the chassis 200 which preferably rotates for ergonomic optimization, and comprises a primary aperture 203 for insertion of a computer.

Figure 4:
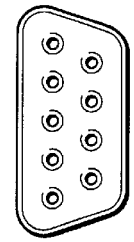
FIG. 4 shows a connector footprint which is used, in the recess in the docking station, to form electrical connections upon insertion of the notebook computer.

FIG. 4 shows a connector footprint which is used, in the recess in the docking station, to form electrical connections upon insertion of the notebook computer. In this example this connector is a DB-9 connector which has been modified for zero-insertion-force, but of course various other connectors can be used. Many examples are shown in the literature referenced above.

Figure 3:
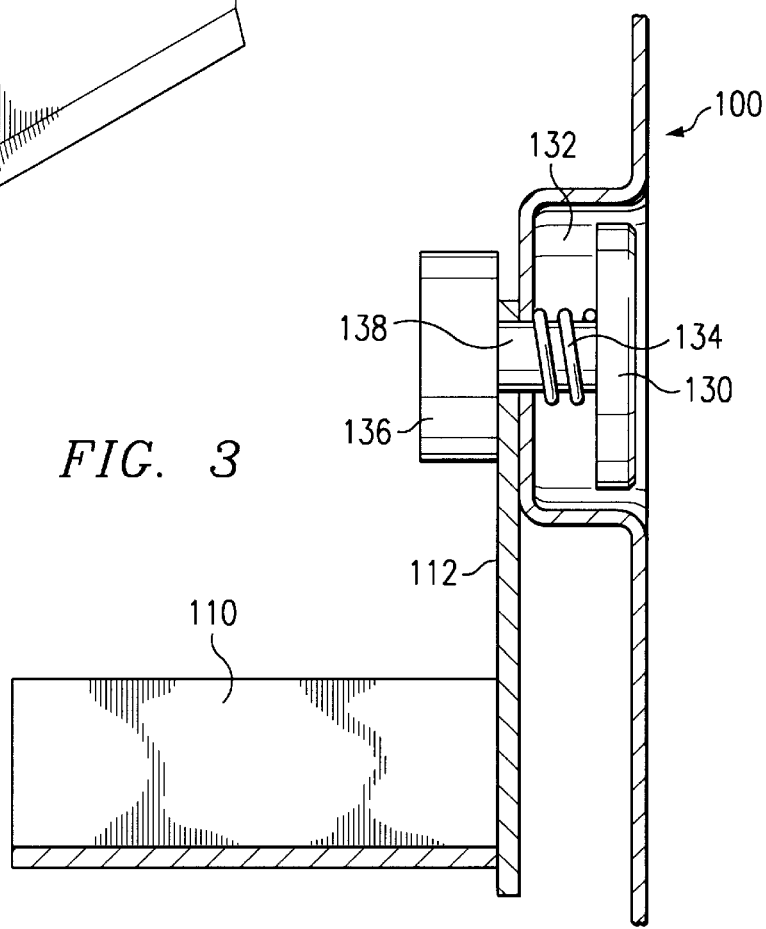
FIG. 3 shows a sample implementation of the mechanism by which the button releases the rotation of the receiver.

FIG. 3 shows a sample implementation of the mechanism by which button 130 releases the rotation of the receiver 110. The body 100 includes a recess 132 within which button 130 is located. The spring 134 pushes outward on the button 130. Button 130 is connected (by shaft 138) to a brake disk 136. Brake disk 136 presses against fixed disk 112 (which is fixedly connected to receiver 110), to press it against a roughened inner surface of the recess 132. The bottom of receiver 110 is preferably a portion of a surface of rotation, and rests on a complementary inner surface of the body 100. A cutout is provided for flexible wires to extend down from the connectors in receiver 110.

Figure 5:
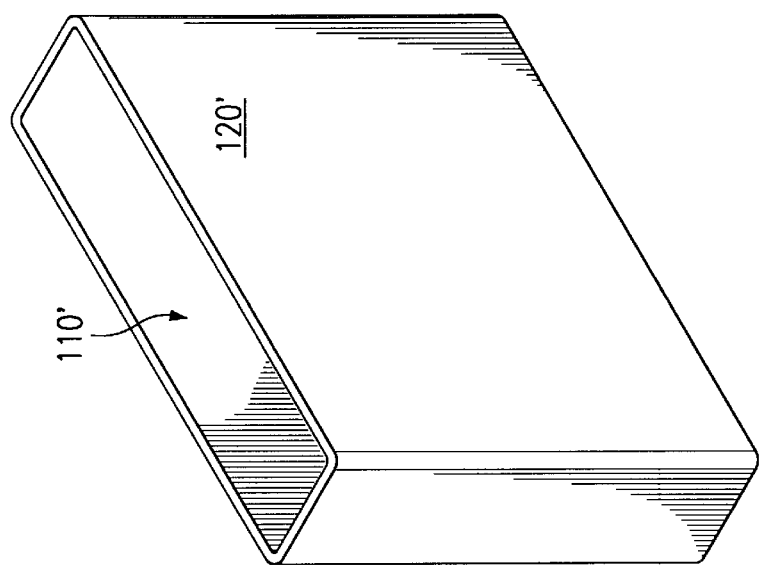
FIG. 5 shows a sample docking station.

FIG. 5 shows a sample docking station 120' with a docking location 110' for docking the computer. The portable computer is a notebook or subnotebook in this embodiment, and is preferably inserted into the first docking location 110' at a near-vertical angle (more than 45° from horizontal, and preferably more than 70° from horizontal). The verticality of insertion helps to provide extra force to make a good electrical connection, and to avoid disruption of contacts due to ambient shock (e.g. from a user bumping the desk). Thus the first docking location 110' in a docking station 120' is oriented vertically or near-vertically, and is dimensioned to receive a computer in the closed (transportable) configuration.

Figure 6:
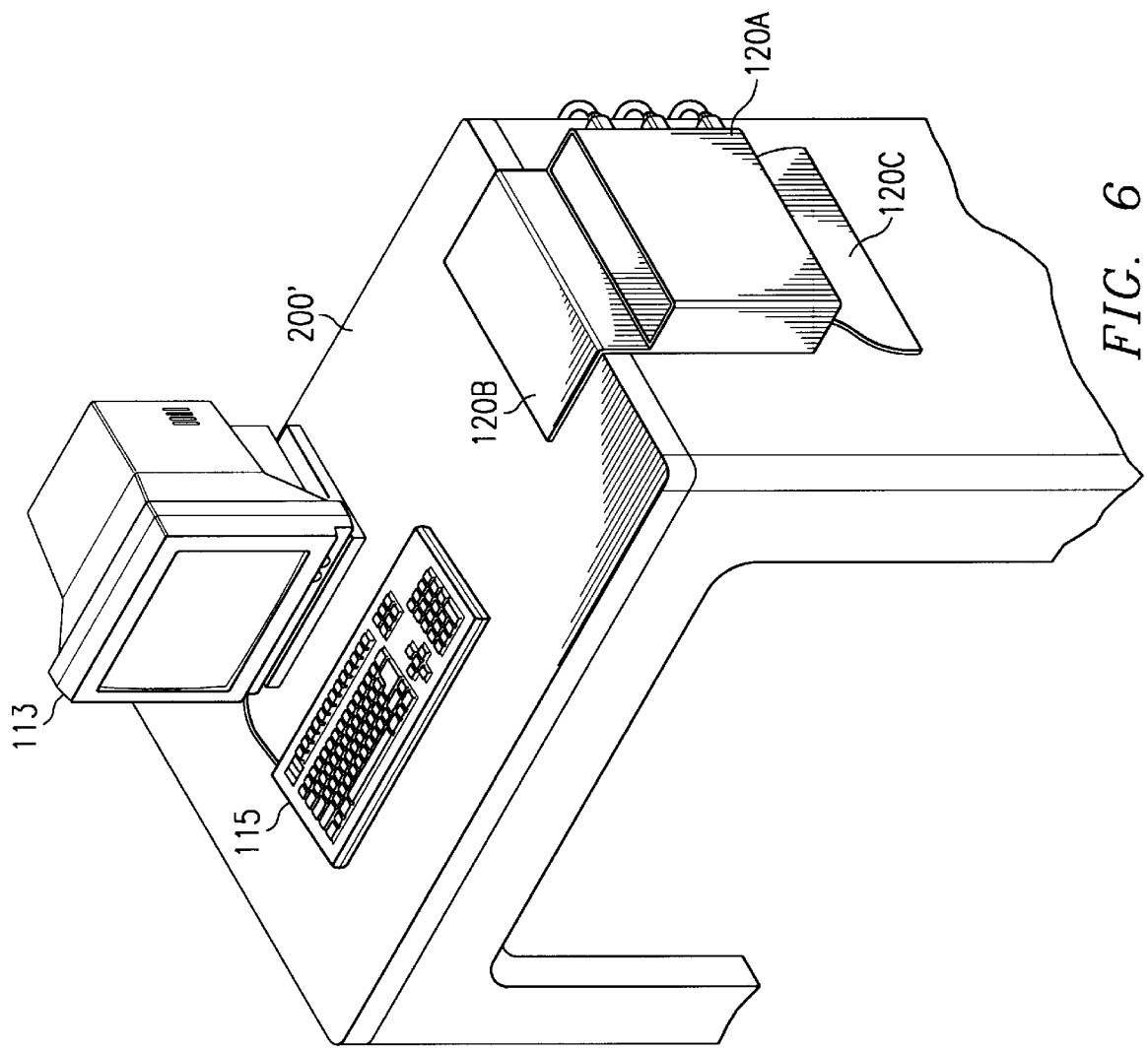
FIG. 6 shows a modified embodiment of the station of FIG. 5 mounted to the right side of a desk.

FIG. 6 shows a modified docking station 120A mounted to the right side of a desk 200'. This is advantageous in terms of workplace organization and economics, since it provides docking at an ergonomically convenient height, permits a user to exploit any underutilized space, and does not take up desktop space. Note that, in this embodiment, the docking station 120A is stabilized by a horizontal extension 120B which lies on the surface of the desk, and a vertical extension 120C which extends down along the side of the desk. These extensions provide additional stability when the computer is inserted or withdrawn. The physical attachment to the desk is preferably secured, for example, with screws, nails, or glue. Depending on the design of the desk itself, the mechanical connection between the docking station 120' and the desk may use a horizontal extension of the docking station 120' as shown, or may use a simple attachment to the vertical side of the desk. The cabling shown permits the user to access the portable computer 100' through desktop user interface devices (monitor 113 and keyboard 115, in this example).

Figure 7:
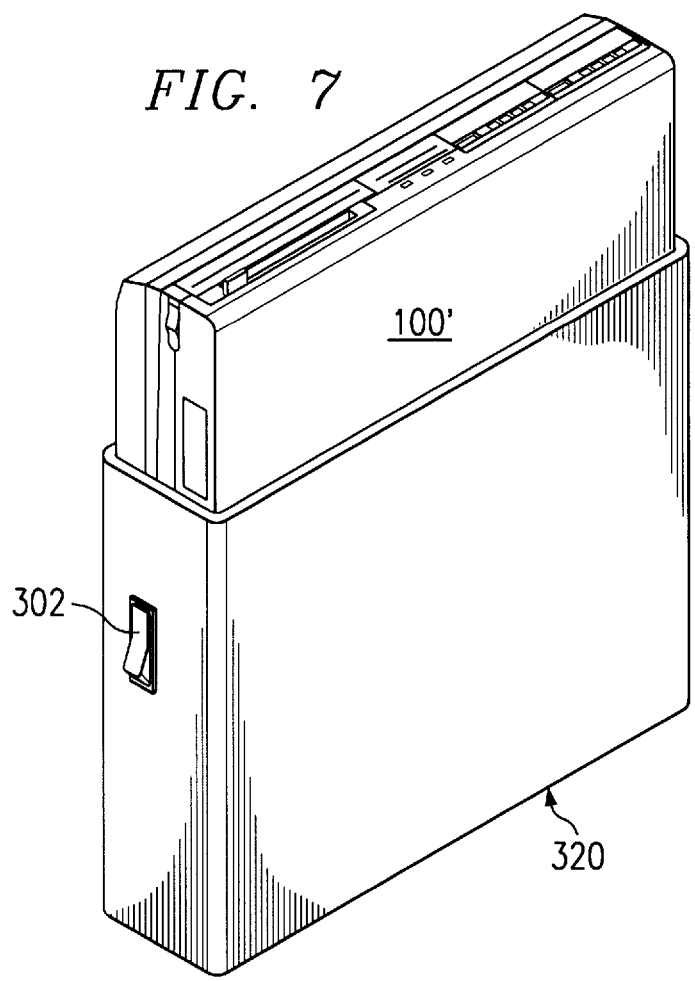
FIG. 7 shows a docking station with computer inserted.

FIG. 7 shows a docking station with a computer installed. Preferably the docking station 120' includes a power switch 302 (shown in FIGS. 7 and 8) which is connected to disable at least some operations of the docked computer. In the presently preferred embodiment this switch simply interrupts all power to the computer; optionally this switch can be connected so that it interrupts only one power connection to the computer, but does not interrupt power on another connection to the computer.

According to a disclosed class of innovative embodiments, there is provided: A portable computer docking system, comprising: a portable computer including interface connectors connected to provide external data communication; a docking station body having mounted therein, with a rotatably adjustable mechanical connection, a receiver dimensioned to receive said portable computer; and one or more docking connectors, positioned in said receiver to form connections with said interface connectors when said computer is positioned in said receiver, including data connectors which are connected to provide data communication between said computer and the exterior of said docking station; whereby a user can adjust the angle of said receiver, within said docking station body, to provide the most ergonomically favorable angle of insertion.

According to another disclosed class of innovative embodiments, there is provided: A portable computer docking system, comprising: a portable computer including interface connectors connected to provide display signal outputs and to receive user input signals; a docking station body having mounted therein, with a rotatably adjustable mechanical connection, a receiver dimensioned to receive said portable computer; and docking connectors, positioned in said receiver to form electrical connections with said interface connectors when said computer is positioned in said receiver, including a power connection which provides power to said computer in said receiver, and data connectors connected, through flexible leads, to route said display signal outputs and user input signals between said computer and the exterior of said docking station body; whereby a user can adjust the angle of said receiver, within said docking station body, to provide the most ergonomically favorable angle of insertion.

According to another disclosed class of innovative embodiments, there is provided: A portable computer docking system, comprising: a portable computer including interface connectors connected to provide external data communication; a docking station which is mechanically attachable to a vertical surface, and dimensioned to receive said portable computer at an insertion angle which is in the range of 45°–80° inclusive from horizontal; and one or more docking connectors, positioned in said receiver to form connections with said interface connectors when said computer is positioned in said receiver, including data connectors which are connected to provide data communication between said computer and the exterior of said docking station.

According to another disclosed class of innovative embodiments, there is provided: A docking station for receiving a portable computer, comprising: a docking station body having mounted therein, with a rotatably adjustable mechanical connection, a receiver dimensioned to receive a portable computer which has interface connectors connected to provide external data communication; and one or more docking connectors, positioned in said receiver to form connections with the interface connectors of a computer positioned in said receiver, including data connectors which are connected to provide data communication between the computer and the exterior of said docking station; whereby a user can adjust the angle of said receiver, within said docking station body, to provide the most ergonomically favorable angle of insertion.

According to another disclosed class of innovative embodiments, there is provided: A docking station for receiving a portable computer, comprising: a docking station body having mounted therein, with a rotatably adjustable mechanical connection, a receiver dimensioned to receive a portable computer which has interface connectors connected to provide external data communication; and docking connectors, positioned in said receiver to form electrical connections with said interface connectors when said computer is positioned in said receiver, including a power connection which provides power to the computer in said receiver, and data connectors connected, through flexible leads, to route said display signal outputs and user input signals between the computer and the exterior of said docking station body; whereby a user can adjust the angle of said receiver, within said docking station body, to provide the most ergonomically favorable angle of insertion.

According to another disclosed class of innovative embodiments, there is provided: A docking station for receiving a portable computer, comprising: a docking station body which is mechanically attachable to a vertical surface, and is dimensioned to receive a portable computer at an insertion angle which is in the range of 45°–80° inclusive from horizontal; and one or more docking connectors, positioned in said body to form connections with said interface connectors when the computer is positioned in said body, including data connectors which are connected to provide data communication between said computer and the exterior of said docking station.

According to another disclosed class of innovative embodiments, there is provided: A method of docking a portable computer, comprising the steps of: (a.) inserting the computer into a docking station body having mounted therein, with a rotatably adjustable mechanical connection, a receiver dimensioned to receive said portable computer; wherein docking connectors are positioned in said body to mate with said computer in said first docking location; and (b.) while said computer is turned on, routing all data communication with said computer through said docking connectors.

According to another disclosed class of innovative embodiments, there is provided: A method of docking a portable computer, comprising the steps of: (a.) inserting the computer into a docking station body having mounted therein, with a rotatably adjustable mechanical connection, a receiver dimensioned to receive said portable computer; wherein docking connectors are positioned in said body to mate with said computer in said first docking location; and (b.) after said step (a.), routing display signal outputs from said computer to an external display, and routing user input signals from an external user input device to said computer, through said docking connectors; and (c.) operating said computer using said external display, and said external user input device.

According to another disclosed class of innovative embodiments, there is provided: A method of docking a portable computer, comprising the steps of: (a.) inserting the computer into a docking station body which is mounted on a vertical surface, at an insertion angle which is in the range of 45°–80° inclusive from horizontal; and (b.) operating the computer, while still in the docking station body, using data communication paths which are routed through docking connectors in the interior of said docking station body.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

It should also be noted that the disclosed innovative ideas are not limited to the generation of computers referred to as "notebook" computers, but are also applicable to subnotebooks, palmtops, and other present and future sizes of computers.

In a contemplated alternative embodiment, two axes of rotation can be provided. Again, a locking mechanism is preferably used, so that the user can adjust this to the most ergonomically favorable angle, and leave it adjusted.

As another alternative embodiment, the disclosed innovations can also be adapted to a wall-mounted (or deskside-mounted) docking station where the whole docking unit swivels with respect to the mounting plate. This embodiment is less preferred, but will provide some of the advantages of the preferred embodiment.

For example, it is preferable (but not necessary) to have an interchangeable connector footprint for docking ANY module, so that a battery or CD-ROM or floppy drive could all be docked in the same slot.

For example, the exterior of the docking station can optionally also include one or more other connections to provide network interface, PCMCIA expander connections, and/or connectors for PCI or SCSI or other bus formats.

For another example, while the docking location are configured, in the presently preferred embodiment, as slots extending into the docking station, it is also possible to use a more open physical configuration, in which guide rails locate a component with respect to the electrical contact locations.

For another example, the user inputs which are routed to the docked computer can include not only keyboard and pointing device, but also a microphone, video camera, 3-D display, eyeball position tracker, or other input or display devices.

For another example, but the described docking station uses simple manual insertion, without a latching or locking device, the disclosed innovations can also be adapted to embodiments with latching or locking devices or with powered insertion. However, one of the advantages of the disclosed innovations is that they reduce the need for powered insertion mechanisms, and hence embodiments with powered insertion are distinctly less preferable.

For example, the disclosed inventions can also advantageously be embodied in computer systems which use a wireless external keyboard.

It should also be noted that the disclosed innovative ideas are not by any means limited to systems using a single-processor CPU, but can also be implemented in computers using multiprocessor architectures.

For another example, although the computer is inserted back-end-first in the presently preferred embodiment, it can optionally be configured so that the docking connectors are on one of the sides, or even on the front face of the computer. (Indeed the computer does not necessarily have to be shaped as a parallelepiped.)

For another example, although the data connections to the computer are implemented as actual electrical connections in the presently preferred embodiment, these connections can also be implemented as short-range optical connections (e.g. using one or more phototransistor/LED pairs to provide one or more optically coupled data channels). In this case optical fiber can be used to provide a flexible connection to the adjustable part of the docking station, or alternatively (if the number of optical channels is small) it may be possible to provide optical coupling directly to the fixed part of the docking station.

For another example, although a quick-release control is used to release the rotational adjustment in the presently preferred embodiment, the mechanism can alternatively and less preferably be constructed so that the user performs adjustment (still without tools) simply by applying an appropriate level of force. However, in this case the mechanism must be robust enough to permit repeated adjustments over the life of the installation, without loosening so much as to permit slippage during normal usage.

For another example, the exterior of the docking station can be made of various materials (preferably molded polymer), and can optionally have a customized shape, color, texture, labelling, or composition.

What is claimed is:

1. A portable computer docking system, comprising:
   a portable computer including interface connectors connected to provide external data communication;
   a docking station body comprising a pocket which has an opening which has a long axis, and having mounted in the interior thereof, with a rotatably adjustable mechanical connection that can be swiveled to provide a direction of insertion which is angled from one end of said long axis toward the other end, a receiver dimensioned to receive said portable computer when said computer is in a closed position; and
   one or more docking connectors, positioned in said receiver to form connections with said interface connectors when said computer is positioned in said receiver, including data connectors which are connected to provide data communication between said computer and the exterior of said docking station;

wherein a user can adjust the angle of said receiver, within said docking station body, to provide the most ergonomically favorable angle of insertion.

2. The system of claim 1, wherein said rotatably adjustable mechanical connection permits adjustment about only one axis of rotation.

3. The system of claim 1, further comprising a display which is separate from said computer and said docking station, and which is connected to receive display signal outputs from said computer through said complementary interface connectors.

4. The system of claim 1, wherein display signal outputs are routed through a VGA output connector on the exterior of said docking station.

5. The system of claim 1, wherein said computer is a note-booksized portable computer.

6. The system of claim 1, wherein said computer includes an integral display which is not visible when said computer is in said closed position.

7. A portable computer docking system, comprising:
 a portable computer including interface connectors connected to provide external data communication;
 a docking station body having mounted in the interior thereof, with a rotatable adjustable mechanical connection, a receiver dimensioned to receive said portable computer when said computer is in a closed position; and
 one or more docking connectors, positioned in said receiver to form connections with said interface connectors when said computer is positioned in said receiver, including data connectors which are connected to provide data communication between said computer and the exterior of said docking station;
 wherein a user can adjust the angle of said receiver, within said docking station body, to provide the most ergonomically favorable angle of insertion;
 wherein said computer has a substantially flattened shape defining a major plane, and said rotatably adjustable mechanical connection permits rotation of said receiver about an axis of rotation which is substantially normal to said major plane.

8. A portable computer docking system, comprising:
 a portable computer including interface connectors connected to provide display signal outputs and to receive user input signals;
 a docking station body comprising a pocket which has an opening which has a long axis, and having mounted in the interior thereof, with a rotatably adjustable mechanical connection, a receiver dimensioned to receive said portable computer when said computer is in a closed position; and
 docking connectors, positioned in said receiver to form electrical connections with said interface connectors when said computer is positioned in said receiver, including a power connection which provides power to said computer in said receiver, and data connectors connected, through flexible leads, to route said display signal outputs and user input signals between said computer and the exterior of said docking station body;
 wherein said receiver can be swiveled to provide a variable direction of insertion which is angled from one end of said long axis toward the other end, within said docking station body, to provide the most ergonomically favorable angle of insertion.

9. The system of claim 8, wherein said rotatably adjustable mechanical connection permits adjustment about only one axis of rotation.

10. The system of claim 8, wherein said computer has a substantially flattened shape defining a major plane, and said rotatably adjustable mechanical connection permits rotation of said receiver about an axis of rotation, which is substantially normal to said major plane after said computer has been inserted into said receiver.

11. The system of claim 8, further comprising a display which is separate from said computer and said docking station, and which is connected to receive said display signal outputs from said computer through said complementary interface connectors.

12. The system of claim 8, wherein said display signal outputs are routed through a VGA output connector on the exterior of said docking station.

13. The system of claim 8, wherein said computer is a notebook-sized portable computer.

14. The system of claim 8, wherein said computer includes an integral display which is not visible when said computer is in said closed position.

15. A docking station for receiving a portable computer, comprising:
 a docking station body comprising a pocket which has an opening which has a long axis, and having mounted in the interior thereof, with a rotatably adjustable mechanical connection, a receiver dimensioned to receive the portable computer; and
 one or more docking connectors, positioned in said receiver to form connections with interface connectors of the computer positioned in said receiver, including data connectors which are connected to provide data communication between the computer and the exterior of said docking station;
 wherein said receiver portion can be swiveled to provide a direction of insertion which is angled from one end of said long axis to provide the most ergonomically favorable angle of insertion.

16. The docking station of claim 15, wherein said rotatably adjustable mechanical connection permits adjustment about only one axis of rotation.

17. The docking station of claim 15, wherein the computer has a substantially flattened shape defining a major plane, and said rotatably adjustable mechanical connection permits rotation of said receiver about an axis of rotation, which is substantially normal to said major plane after the computer has been inserted into said receiver.

18. The docking station of claim 15, further comprising a display which is separate from the computer and said docking station, and which is connected to receive display signal outputs from the computer through said complementary interface connectors.

19. The docking station of claim 15, wherein display signal outputs are routed through a VGA output connector on the exterior of said docking station.

20. The docking station of claim 15, wherein said docking station body is dimensioned to receive a notebook-sized portable computer.

21. The docking station of claim 15, wherein said docking station body is dimensioned to receive the computer only when said computer is closed.

22. A docking station for receiving a portable computer, comprising:
 a docking station body comprising a pocket which has an opening which has a long axis, and having mounted in the interior thereof, with a rotatably adjustable mechanical connection, a receiver dimensioned to receive the portable computer; and docking connectors, positioned in said receiver to form electrical connections with interface connectors of the computer when the computer is positioned in said receiver, including a power connection which provides power to the computer in said receiver, and data connectors connected, through flexible leads, to route display signal outputs and user input signals between the computer and the exterior of said docking station body;

wherein said receiver portion can be swiveled to provide a direction of insertion which is angled from one end of said long axis toward the other end to provide the most ergonomically favorable angle of insertion.

23. The docking station of claim 22, wherein said rotatably adjustable mechanical connection permits adjustment about only one axis of rotation.

24. The docking station of claim 22, wherein said receiver defines a plane of insertion of the computer, and said rotatably adjustable mechanical connection permits rotation of said receiver about an axis of rotation, which is substantially normal to said plane of insertion.

25. The docking station of claim 22, further comprising a display which is separate from the computer and said docking station, and which is connected to receive said display signal outputs from the computer through said complementary interface connectors.

26. The docking station of claim 22, wherein said display signal outputs are routed through a VGA output connector on the exterior of said docking station.

27. The docking station of claim 22, wherein said docking station body is dimensioned to receive a notebook-sized portable computer.

28. The docking station of claim 22, wherein said docking station body is dimensioned to receive the computer only when the computer is closed.

29. A method of docking a portable computer, comprising the steps of:

(a.) inserting said computer into a docking station body comprising a pocket which has an opening which has a long axis, and having mounted therein, with a rotatably adjustable mechanical connection that can be swiveled to provide a direction of insertion which is angled from one end of said long axis toward the other end, a receiver dimensioned to receive said portable computer, said receiver being totally enclosed inside said body; wherein docking connectors are positioned in said body to mate with said computer in said body; and (b.) while said computer is turned on, routing all data communication with said computer through said docking connectors.

30. The method of claim 29, wherein said rotatably adjustable mechanical connection permits adjustment about only one axis of rotation.

31. The method of claim 29, wherein said computer has a substantially flattened shape defining a major plane, and said rotatably adjustable mechanical connection permits rotation of said receiver about an axis of rotation, which is substantially normal to said major plane after said computer has been inserted into said receiver.

32. The method of claim 29, further comprising:

(c.) routing display signal outputs from said computer through said complementary docking connectors to an external display which is separate from said computer and said docking station.

33. The method of claim 29, further comprising:

routing display signal outputs through a VGA output connector on the exterior of said docking station.

34. The method of claim 29, wherein said computer is a notebook-sized portable computer.

35. The method of claim 29, wherein said computer can be closed, and includes an integral display which is not visible when said computer is closed, and wherein said docking station body is dimensioned to receive said computer only when said computer is closed.

36. A method of docking a portable computer, comprising the steps of:

(a.) inserting the computer into a docking station body comprising a pocket which has an opening which has a long axis, and having mounted in the interior thereof, with a rotatably adjustable mechanical connection that can be swiveled to provide a direction of insertion which is angled from one end of said long axis toward the other end, a receiver dimensioned to receive said portable computer when said computer is in a closed position; wherein docking connectors are positioned in said body to mate with said computer in said body; and (b.) after said step (a.), routing display signal outputs from said computer to an external display, and routing user input signals from an external user input device to said computer, through said docking connectors; and (c.) operating said computer using said external display, and said external user input device.

37. The method of claim 36, wherein said rotatably adjustable mechanical connection permits adjustment about only one axis of rotation.

38. The method of claim 36, wherein said computer has a substantially flattened shape defining a major plane, and said rotatably adjustable mechanical connection permits rotation of said receiver about an axis of rotation, which is substantially normal to said major plane after said computer has been inserted into said receiver.

39. The method of claim 36, wherein, in said step (b.), said display signal outputs are routed through a VGA output connector on the exterior of said docking station.

40. The method of claim 36, wherein said computer is a notebook-sized portable computer.

41. The method of claim 36, wherein said computer can be closed, and includes an integral display which is not visible when said computer is closed, and wherein said docking station body is dimensioned to receive said computer only when said computer is in said closed position.

42. The method of claim 36, wherein in said step (b.), all said display signal outputs from said computer to an external display are routed only through said docking connectors.

43. The method of claim 36, wherein in said step (b.), all said user input signals from an external user input device to said computer are routed only through said docking connectors.

44. The method of claim 1, wherein in said step (c.), said computer is operated using only data communication paths which are routed through said docking connectors.

45. A method of docking a portable computer, comprising the steps of:

(a.) inserting said computer, in a closed position, into a docking station body which is mounted on a vertical surface, at an insertion angle which is in the range of 45°–80° inclusive from horizontal; and (b.) operating said computer, while still in said docking station body, using data communication paths which are routed through docking connectors in the interior of said docking station body;

wherein said computer has a substantially flattened shape defining a major plane, and said docking station comprises a receiver having a rotatably adjustable mechanical connection which permits rotation of said computer about an axis of rotation, which is substantially normal to a major plane of said computer which has been inserted into said receiver.

* * * * *

UNITED STATES PATENT AND TRADEMARK OFFICE
CERTIFICATE OF CORRECTION

PATENT NO. : 5,875,094

DATED : February 23, 1999

INVENTOR(S) :. Michael Kirkendoll

It is certified that error appears in the above-identified patent and that said Letters Patent is hereby corrected as shown below:

IN THE CLAIMS:

Column 12, line 62, Claim 44, line 1, "1" should be changed to --36--.

Signed and Sealed this

Twenty-fifth Day of May, 1999

*Attest:*

Q. TODD DICKINSON

*Attesting Officer*   *Acting Commissioner of Patents and Trademarks*